United States Patent
Evans et al.

(10) Patent No.: US 7,778,265 B2
(45) Date of Patent: Aug. 17, 2010

(54) METHOD AND APPARATUS FOR LOCAL ADAPTIVE PROVISIONING AT A NODE

(75) Inventors: Scott Charles Evans, Burnt Hills, NY (US); Ping Liu, Simpsonville, SC (US); Thomas Markham, Niskayuna, NY (US); Ishan Prabhath Weerakoon, Rockville, MD (US); Sergei Dolinsky, Clifton Park, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 115 days.

(21) Appl. No.: 12/132,994

(22) Filed: Jun. 4, 2008

(65) Prior Publication Data

US 2009/0304014 A1 Dec. 10, 2009

(51) Int. Cl.
*H04L 12/56* (2006.01)
(52) U.S. Cl. ...................................... 370/412
(58) Field of Classification Search ................ None
See application file for complete search history.

(56) References Cited

U.S. PATENT DOCUMENTS

| 7,023,857 | B1 * | 4/2006 | Chiussi et al. ............ 370/395.4 |
| 7,142,512 | B1 * | 11/2006 | Kobayashi et al. ........... 370/232 |
| 2006/0067213 | A1 * | 3/2006 | Evans et al. ................ 370/229 |
| 2007/0002740 | A1 * | 1/2007 | Evans et al. .............. 370/230.1 |
| 2008/0253325 | A1 * | 10/2008 | Park et al. .................... 370/329 |

OTHER PUBLICATIONS

Yagan, D. and Tham, C. K., "Adaptive QoS Provisioning in Wireles Ad Hoc Networks: A Semi-MDP Approach," Wireless Communications and Networking Conf, 2005 IEEE Mar. 2005 pp. 2238-2244 vol. 4.
Evans, S. C., Liu, P., Hartman, M., Egan, M. and Weerakoon, I., "End-to-End QoS through Distress Biased Services: A Triage Approach" MILCOM 2005, Atlantic City, N.J. Oct. 2005.
Evans, Pearlman, Hartman, Rothe, Egan, and Leiva. "Route Based QoS and The Biased Early Drop (BED) Algorithm," QSHINE 2005.
Liu, P., Evans, S. C., and Weerakoon, I. "Bandwidth Gain of the Triage Quality of Service Protocol and Mobility Effects," MILCOM 2006, Washington D.C., Oct. 2006.
Evans, S. C., Liu, P., Rothe, A., Goebel, K., Yan, W., Weerakoon, I., and Egan, M. "Adaptive Statistical QoS: Learning Parameters to Maximize End-to-End Network Goodput," MILCOM 2006, Washington D.C., Oct. 2006.

(Continued)

*Primary Examiner*—Chirag G Shah
*Assistant Examiner*—Amarnauth Persaud
(74) *Attorney, Agent, or Firm*—Matthew C. Loppnow; Prass LLP

(57) ABSTRACT

A method (300) and apparatus (200) for local adaptive provisioning at a node is disclosed. The method may include determining (320) a per packet latency for a class of packet network traffic in a queue of a plurality of queues for a plurality of classes of packet network traffic at a node, establishing (330) a reward function for the class of packet network traffic based on a packet latency limit, based on the per packet latency, and based on a source rate for the class of packet network traffic, and adjusting (340) provisioning of a queue at the node based on the reward function.

16 Claims, 10 Drawing Sheets

OTHER PUBLICATIONS

Sankaran, S. and A. E. Kamal, "A Combined Delay and Throughput Proportional Scheduling Scheme for Differentiated Services", IEEE Globecom, Nov. 2002.

Evans, S. C., Markham, T. S, Liu, P. and Weerakoon, I., "Network Quality of Service through Local Adaptive Provisioning," MILCOM 2007, Orlando, FL, Oct. 2007.

* cited by examiner

METHOD AND APPARATUS FOR LOCAL ADAPTIVE PROVISIONING AT A NODE

BACKGROUND

1. Field

The present disclosure is directed to a method and apparatus for local adaptive provisioning at a node. More particularly, the present disclosure is directed to adjusting node weighted fair queue settings based on queue depth and projected end to end success.

2. Introduction

Presently, information can be sent from a source to a destination over the Internet by breaking data into packets. These packets often travel through multiple intermediate nodes before being reassembled at the destination where the exact path from source to destination may vary due to the amount of network traffic and other factors. Proper network configuration settings, such as proper provisioning, can be critical to such mission success. The success of settings depends on the congestion level of the network and the mix of traffic offered. Unfortunately, without an adaptive strategy based on local information, networks either run sub-optimally or waste valuable resources sending statistical information or control information.

For example, a major challenge in achieving network Quality of Service (QoS) is balancing the desire to maximize the amount of traffic served on the network with the assurance that necessary quality is provided. Over-provisioning can provide assurance that traffic admitted to the network is served properly. Unfortunately, over-provisioning can block traffic at the edges of the network that could have been successful, which results in a failure to maximize the network traffic delivered on the network that successfully contributes to mission success.

Ideally, the distribution of class latencies across a network will just fit within desired limits. A network loaded at a "Just Right" condition will have each class of traffic provisioned sufficiently for all flows to meet End-to-End (E2E) latency requirements where no class is so over-provisioned to the point of wasting bandwidth.

In an example scenario, a network with near optimally tuned Weighted Fair Queue (WFQ) settings can have each class of traffic meeting its E2E latency specification without exceeding a limit of 1% packets late or lost. If such a scenario is modified so the connectivity range of the nodes is reduced, packets will have a higher hop count to reach the same destinations. This causes E2E delays to increase and creates higher failure rates for Voice, Video, and Command and control traffic, which would then be under provisioned. Unfortunately, the solution to such a problem is not optimal because it limits the amount of traffic allowed onto the network at all times, which essentially blocks traffic at the edges. Similarly, if the scenario is modified only with respect to the percent of offered load, unacceptable E2E failures can result, because prior systems do not provide an adaptive means of provisioning network resources such that the maximum amount of prioritized classes of traffic is successfully served. Thus, there is a need for a method and apparatus for local adaptive provisioning at a node.

SUMMARY

A method and apparatus for local adaptive provisioning at a node is disclosed. The method may include determining a per packet latency for a class of packet network traffic in a queue of a plurality of queues for a plurality of classes of packet network traffic at a node, establishing a reward function for the class of packet network traffic based on a packet latency limit, based on the per packet latency, and based on a source rate for the class of packet network traffic, and adjusting provisioning of a queue at the node based on the reward function.

BRIEF DESCRIPTION OF THE DRAWINGS

In order to describe the manner in which advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

Figure 1:
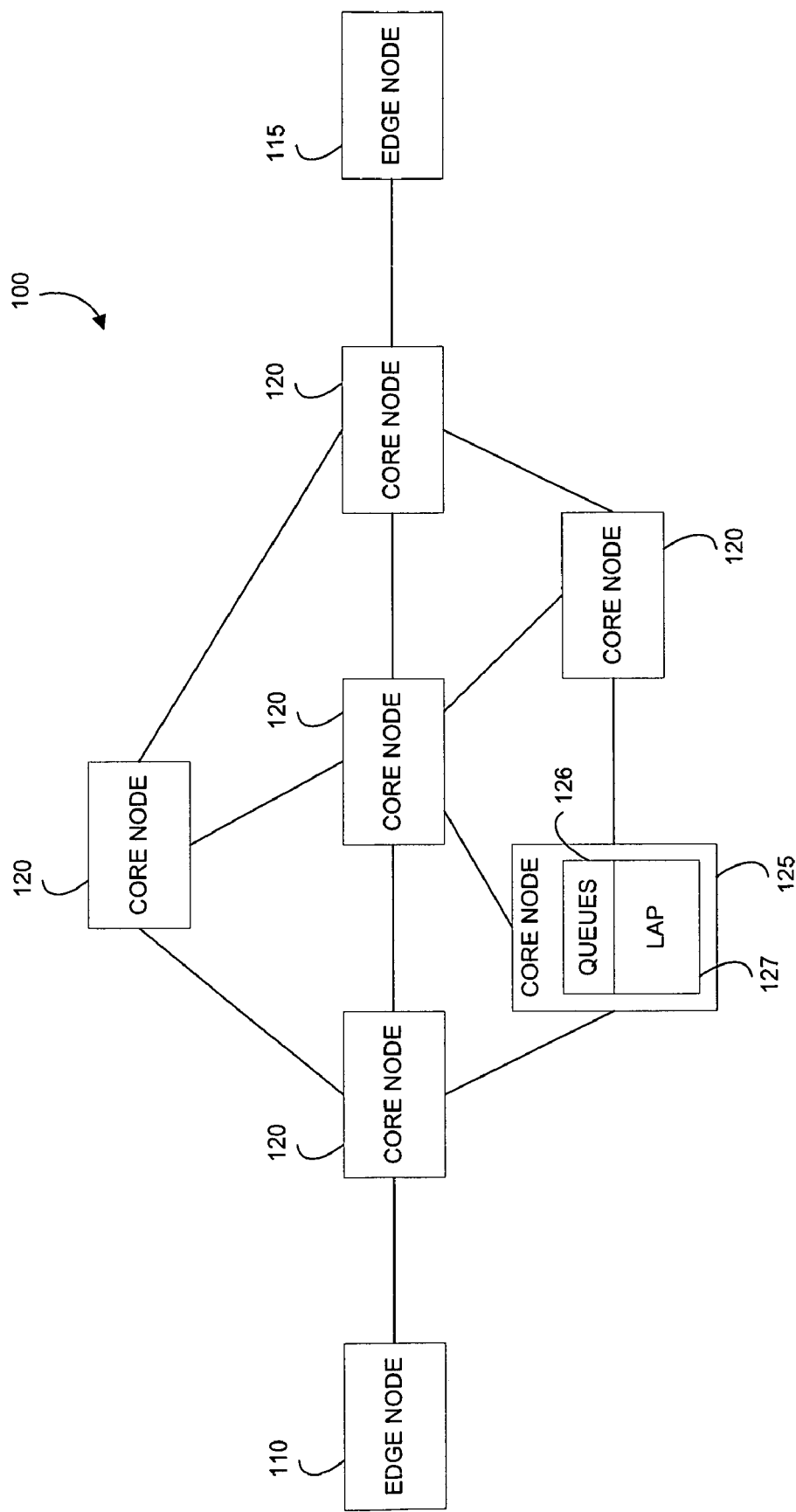
FIG. 1 is an exemplary block diagram of a system in accordance with a possible embodiment.

FIG. 1 is an exemplary block diagram of a system 100 according to one embodiment. The system 100 can be a network including edge nodes 110 and 115 and core nodes 120 and 125. An edge node and a core node may be colocated. The system 100 can communicate packets of information among the nodes. For example, an edge node 110, such as a source node, as well as other nodes can produce packets which are destined for destination nodes, such as the edge node 115. Different classes of packets of information which are transmitted over the network may carry data, Voice over Internet Protocol (VoIP), streaming audio, video information, such as Moving Picture Experts Group (MPEG) video, command and control information, administrative information, best effort information, and other information.

When a packet of data is produced by the edge node 100, it can carry an address tag identifying the destination node, such as edge node 115. A packet leaving the edge node 110 can traverse a path routed by the nodes 120. Each successive node can move the packet toward the destination node 115. Each movement of a packet from one node to the next node can be termed a hop.

The delay which a packet experiences in traversing the system 100 depends upon the number of nodes traversed and upon the delay at each node. Some types of packets can tolerate substantial delays in transit and other packets with time sensitive information, such as VoIP, video, and other time-based information, may be more sensitive to excessive delay. Packets can be tagged with a priority or schedule which can indicate the relative importance of expeditious arrival of the packet at its destination node. Also, packets can have an associated time tag that indicates the last permissible time of arrival at the ultimate destination node. Different classes of packet network traffic can be assigned to different queues of the plurality of queues 126. Each different queue may be accessed with a different priority according to the priority of each class.

According to one embodiment, a node 125 can include a plurality of queues 126 and a local adaptive provisioning module 127. The local adaptive provisioning module 127 can determine an average per packet latency for a class of packet network traffic based on a number of packets for the class of packet network traffic in a queue of the plurality of queues for a plurality of classes of packet network traffic at the node 125. The local adaptive provisioning module 127 can establish a reward function for the class of packet network traffic based on a packet latency limit, based on the per packet latency, and based on a source rate for the class of packet network traffic. The local adaptive provisioning module 127 can adjust provisioning of the queue at the node based on the reward function based on a change in provision Δs for a class i according to:

$$\Delta s_i = \alpha\left(\frac{dR}{ds_i} + c\right),$$

where α can represent a scaling factor, R can represent the reward function, and c can represent a normalizing constant.

Figure 2:
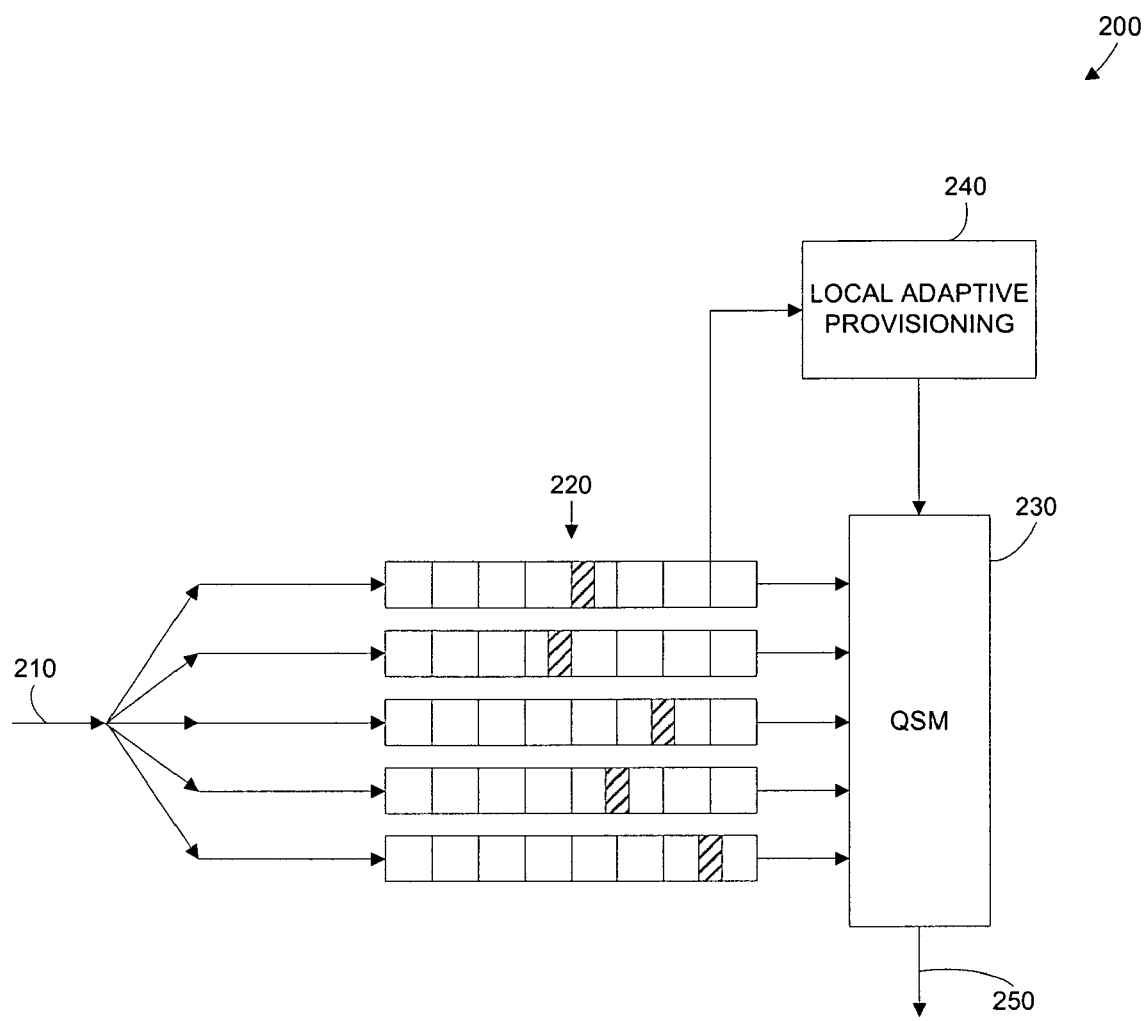
FIG. 2 is an exemplary block diagram of a node according to a possible embodiment.

FIG. 2 is an exemplary block diagram of a node 200, such as the node 125, according to one embodiment. The node 200 can include an input 210, a plurality of queues 220, a queue servicing module 230, a local adaptive provisioning module 240, and an output 250. In operation, the input 210 can receive a packet. The plurality of queues 220 can queue a plurality of classes of packet network traffic at the node 200. The queue servicing module 230 can access the plurality of queues 220 to give priority to higher packet priority level queues. The local adaptive provisioning module 240 can determine a per packet latency for a class of packet network traffic in a queue of the plurality of queues 220, establish a reward function for the class of packet network traffic based on a packet latency limit, based on the per packet latency, and based on a source rate for the class of packet network traffic, and adjust provisioning of the queue servicing module 230 for the queue at the node 200 based on the reward function.

For example, the local adaptive provisioning module 240 can determine a per packet latency by determining a number of packets for a class of packet network traffic in the queue of the plurality of queues 220 for a plurality of classes of packet network traffic at the node 200. The reward function can reflect an anticipated end-to-end success of the class of packet network traffic. The local adaptive provisioning module 240 can determine changes in the reward function with respect to changes in the source rate for the class of packet network traffic with respect to at least one other class of packet network traffic and adjust the provisioning by increasing provisioning for the class of packet network traffic to maximize the change in the reward function. The local adaptive provisioning module 240 can increase provisioning for the class of packet network traffic if the change in the reward function is maximized and above a threshold. The per packet latency can be a mean per packet latency. The reward function can penalize end to end packet failures as measured by end to end latency exceeding a threshold based on relative weighting assigned to failures of each class. The reward function can be further based on an average hop count and based on at least one other class of packet network traffic. The local adaptive provisioning module 240 can adjust the provisioning of a queue at the node 200 based on a change in provision Δs for a class i according to:

$$\Delta s_i = \alpha\left(\frac{dR}{ds_i} + c\right),$$

where α can represent a scaling factor, R can represent the reward function, and c can represent a normalizing constant.

Figure 3:
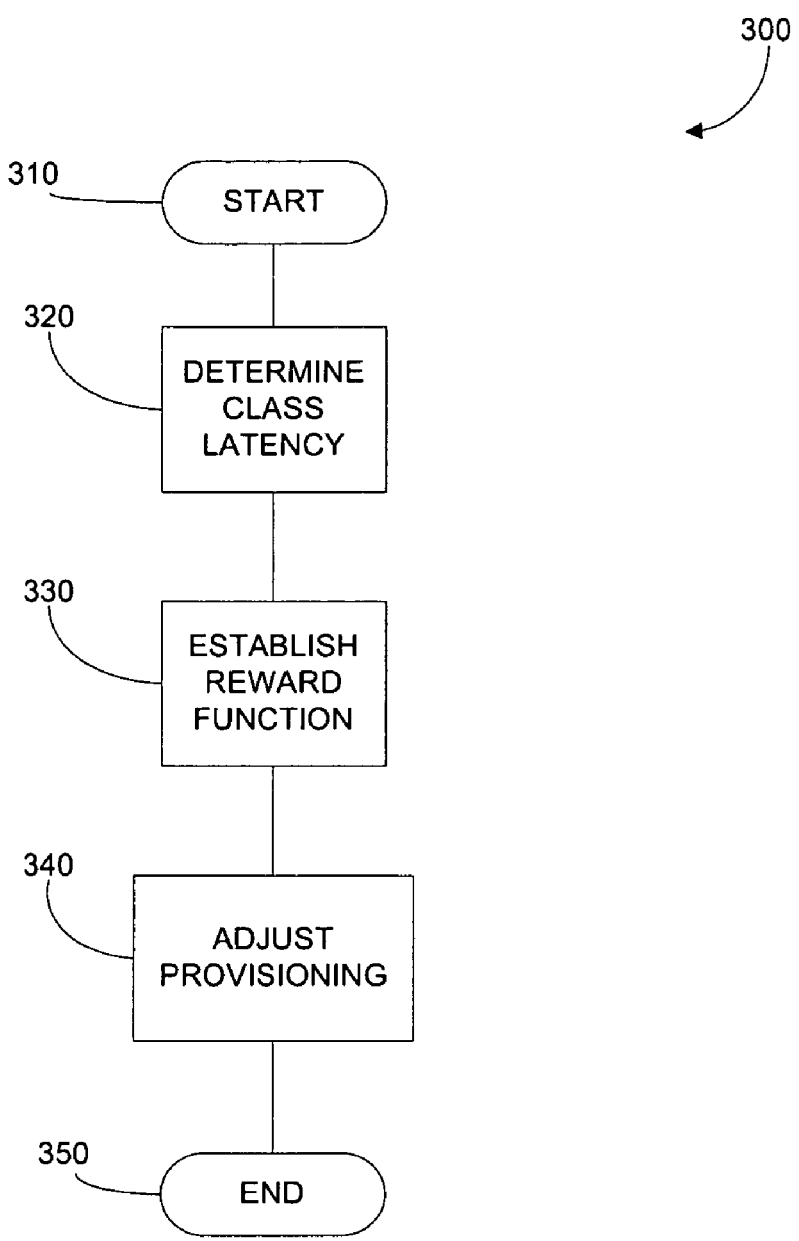
FIG. 3 is an exemplary flowchart illustrating the operation of a node according to a possible embodiment.

FIG. 3 is an exemplary flowchart 300 illustrating the operation of the node 200 according to another embodiment. In step 310, the flowchart begins. In step 320, the node 200 can determine a per packet latency for a class of packet network traffic in a queue of a plurality of queues for a plurality of classes of packet network traffic at the node 200. The per packet latency can be a mean per packet latency. Determining a per packet latency can include determining a number of packets for a class of packet network traffic in a queue of a plurality of queues for a plurality of classes of packet network traffic at the node 200.

In step 330, the node 200 can establish a reward function for the class of packet network traffic based on a packet latency limit, based on the per packet latency, and based on a source rate for the class of packet network traffic. The reward function can be based on failure rates at each node based on queue depths and local parameters. It can try to predict how successful a class of packets is. The reward function can reflect an anticipated end-to-end success of the class of packet network traffic. The reward function can penalize end to end packet failures as measured by end to end latency exceeding a threshold based on relative weighting assigned to failures of each class. The reward function can be based on an average hop count and based on at least one other class of packet network traffic.

The reward function can also be based on additional measured information from a network management system. Additional measured information can include specific latencies through specific paths, can be based on specific distribution of routes and hop counts, can be based on historical paths for certain classes of traffic and/or certain destinations, can include success and failure rates for certain paths, and can include other additional measured information. It can allow for more precise estimates of end to end success.

In step 340, the node 200 can adjust provisioning of a queue at the node 200 based on the reward function. Provisioning can indicate the allocation of the source rate for all classes of packet network traffic at a node. For example, Weighted Fair Queue (WFQ) settings can provision bandwidth allocation for different types of packet traffic, which can influence the source rate for the traffic. Each queue can be accessed with a priority based on the WFQ settings. For example, queues for classes with a higher priority can be accessed more often than other queues.

Adjusting the provisioning of a queue at the node can be based on a change in provision Δs for a class i according to:

$$\Delta s_i = \alpha\left(\frac{dR}{ds_i} + c\right),$$

where α can represent a scaling factor, R can represent the reward function, and c can represent a normalizing constant that may be zero. For example, α can be a coefficient that translates the reward function into a provisioning value. Such a coefficient can be set, predetermined, learned, or otherwise determined. The normalizing constant c can be zero. In step 350, the flowchart 300 can end.

Figure 4:
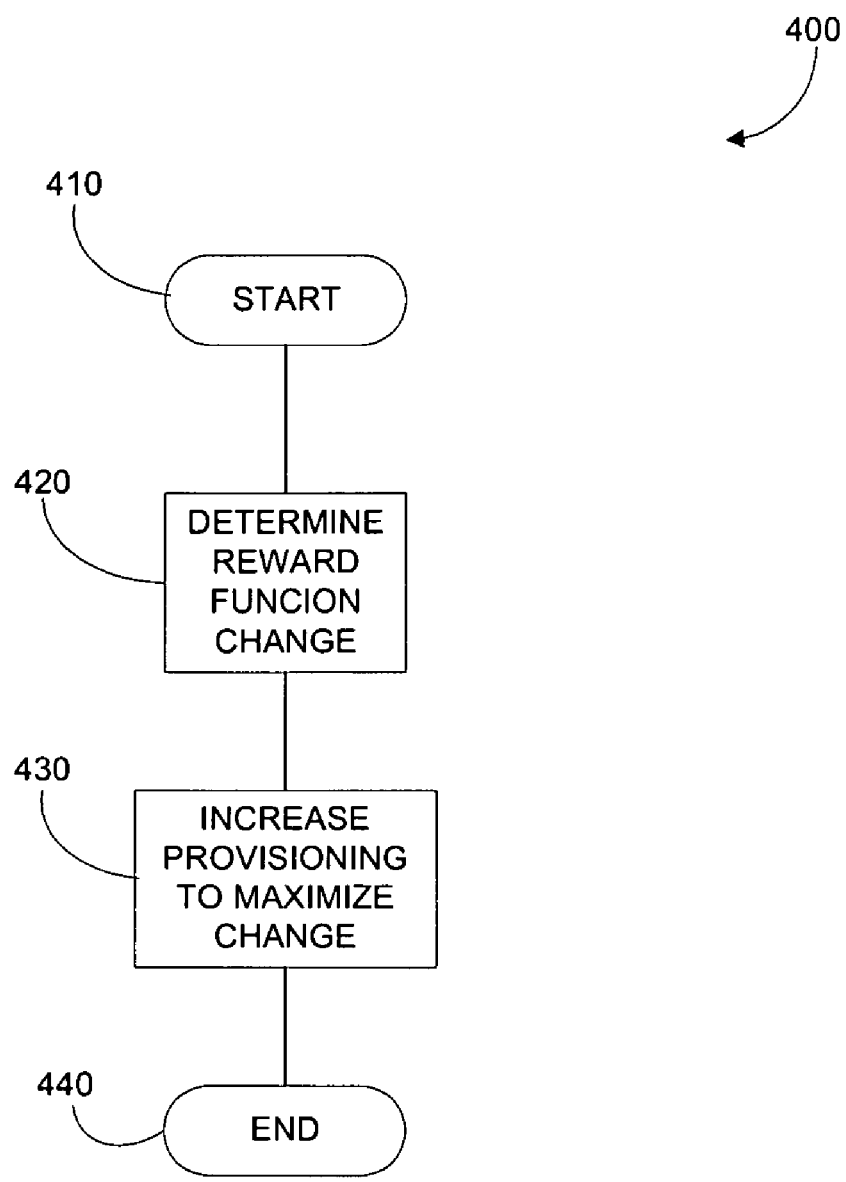
FIG. 4 is an exemplary flowchart illustrating the operation of a node according to another possible embodiment.

FIG. 4 is an exemplary flowchart 400 illustrating the operation of the node 200 according to another related embodiment interchangeable with features of the flowchart 300. In step 410, the flowchart begins. In step 420, the node 200 can determine changes in the reward function with respect to changes in the source rate for the class of packet network traffic with respect to at least one other class of packet network traffic. In step 430, the node 200 can adjust the provisioning of a queue by increasing provisioning for the class of packet network traffic to maximize the change in the reward function. For example, the node 200 can increase provisioning for the class of packet network traffic if the change in the reward function is maximized and above a threshold. The provisioning can be maintained, for example, if there is not a sufficient a positive change in the reward function. In step 440, the flowchart 400 can end.

Therefore, the present disclosure can be used to model the latency characteristics of various classes of traffic over multiple hops using analytical models. A provisioning update formula that can be called a Local Adaptive Provisioning (LAP) algorithm can be derived by constructing a reward function based on traffic success using the analytical model and taking its derivative.

The analytical model can proceed as follows. For class of traffic i, the mean number of packets can be described as:

$$\overline{q}_i = s_i \overline{w}_i,$$

where parameters are defined below in Table 1. Solving for per class mean packet delay results in:

$$\overline{w}_i = \frac{\overline{q}_i}{s_i},$$

While this formula makes no assumption for arrival times, a Poisson arrival process can assumed, resulting in an exponential distribution for average delay. Rather than make the Poisson assumption for arrival times, a Poisson distribution can be assumed for average per class queuing delay, and queue depth can be related to the percent capacity utilized through various scenarios. These assumptions can be made pragmatically based both on intuition regarding the positive delay distribution that can be seen at each hop of a fairly congested network and also the analytical characteristics of the Poisson distribution that can aid the analysis. The validity of the intuition and the use of Poisson distribution for analysis and algorithm development can be verified through simulations. Queue depth can be linked to percent capacity through a linear approximation in the analytical model. For a given data load, if all packet arrivals occur such that none arrive concurrently, then a very low average queue depth can be realized. If packets arrive all at the same time, a very high average queue depth can occur. Traffic engineering and rate control can mitigate the extreme cases to some extent.

TABLE 1

| Parameter | Definition |
| --- | --- |
| $\overline{q}_i$ | Mean number of packets from class i in buffer (packets) |
| $\overline{\mu}_i$ | Service Rate for class of traffic i |
| $s_i$ | Throughput for class of traffic i (packets per second) |
| $s_{tot}$ | Throughput per node for all classes of traffic (packets per second) |
| $\overline{w}_i = \frac{\overline{q}_i}{s_i}$ | Mean packet delay for class i (seconds) |

A reward function can be determined that penalizes End-to-End (E2E) packet failures, as measured by E2E latency exceeding a threshold, based on a relative weighting assigned to failures of each class i. However, instead of measuring failure rate at the edge of the network to compute a global reward value, the failure rates $p_{ij}$ can be predicted at each node based on queue depths and local parameters. A reward function can be composed based on Z values of failure rates based on service class threshold and local parameters:

$$Z_{ij} = \frac{l_{ij} - \overline{h}_{ij} \cdot \overline{w}_{ij}}{\sqrt{\overline{h}_{ij} \cdot \overline{w}_{ij}}},$$

modeling the term $\overline{h}_{ij} \cdot \overline{w}_{ij}$, the mean expected End-to-End latency. A Poisson distribution can be used to estimate latency over a number of hops such that $\lambda_{eff} = \overline{h}_{ij} \cdot \overline{w}_{ij}$ estimates both mean and variance. A Reward function can be composed based on the weighted sum of class success Z scores:

$$R_j = \sum_i c_i Z_{ij}.$$

The subscript j can be dropped when each node performs independent calculations. As an example, for two classes of real time traffic, voice and video as indicated by v for voice and d for video, the derivative of R can be taken with respect to $s_v$ for a given node, with $s_d = (s_t - s_v)$. Assuming the classes of voice and video are equally likely results in:

$$R = Z_v + Z_d$$

$$= \frac{C_v\left(l_v - \overline{h}_v \frac{\overline{q}_v}{s_v}\right)}{\sqrt{\overline{h}_v \frac{\overline{q}_v}{s_v}}} + \frac{C_d\left(l_d - \overline{h}_d \frac{\overline{q}_d}{s_d}\right)}{\sqrt{\overline{h}_d \frac{\overline{q}_d}{s_d}}}$$

Substituting $s_d = (s_t - s_v)$, and taking the derivatives of each part separately and applying the quotient rule results in:

$$R = \frac{C_v\left(l_v - \bar{h}_v \frac{\bar{q}_v}{s_v}\right)}{\sqrt{\bar{h}_v \frac{\bar{q}_v}{s_v}}} + \frac{C_d\left(l_d - \bar{h}_d \frac{\bar{q}_d}{(s_t - s_v)}\right)}{\sqrt{\bar{h}_d \frac{\bar{q}_d}{(s_t - s_v)}}}$$

$$\frac{d}{ds_v}\left(\frac{C_v\left(l_v - \bar{h}_v \frac{\bar{q}_v}{s_v}\right)}{\sqrt{\bar{h}_v \frac{\bar{q}_v}{s_v}}}\right)$$

$$= \frac{\frac{C_v \bar{h}_v \bar{q}_v}{s_v^2}\sqrt{\bar{h}_v \frac{\bar{q}_v}{s_v}} + \frac{C_v\sqrt{\bar{h}_v \bar{q}_v}}{2 s_v^{3/2}}\left(l_v - \bar{h}_v \frac{\bar{q}_v}{s_v}\right)}{\bar{h}_v \frac{\bar{q}_v}{s_v}}$$

$$= \frac{C_v l_v}{2 s_v^{1/2}\sqrt{\bar{h}_v \bar{q}_v}} + \frac{C_v\sqrt{\bar{h}_v \bar{q}_v}}{2 s_v^{3/2}}$$

Similarly, $$\frac{d}{ds_v}\left(\frac{C_d\left(l_d - \bar{h}_d \frac{\bar{q}_d}{s_t - s_v}\right)}{\sqrt{\bar{h}_d \frac{\bar{q}_d}{s_t - s_v}}}\right) = -\frac{C_d l_d}{2(s_t - s_v)^{1/2}\sqrt{\bar{h}_d \bar{q}_d}} - \frac{C_d \sqrt{\bar{h}_d \bar{q}_d}}{2(s_t - s_v)^{3/2}}$$

Thus:

$$\frac{dR}{ds_v} = \frac{C_v}{2}\left(\frac{l_v}{\sqrt{s_v \bar{h}_v \bar{q}_v}} + \frac{\sqrt{\bar{h}_v \bar{q}_v}}{s_v^{3/2}}\right) - \frac{C_d}{2}\left(\frac{l_d}{(s_t - s_v)^{1/2}\sqrt{\bar{h}_d \bar{q}_d}} + \frac{\sqrt{\bar{h}_d \bar{q}_d}}{(s_t - s_v)^{3/2}}\right)$$

Figure 5:
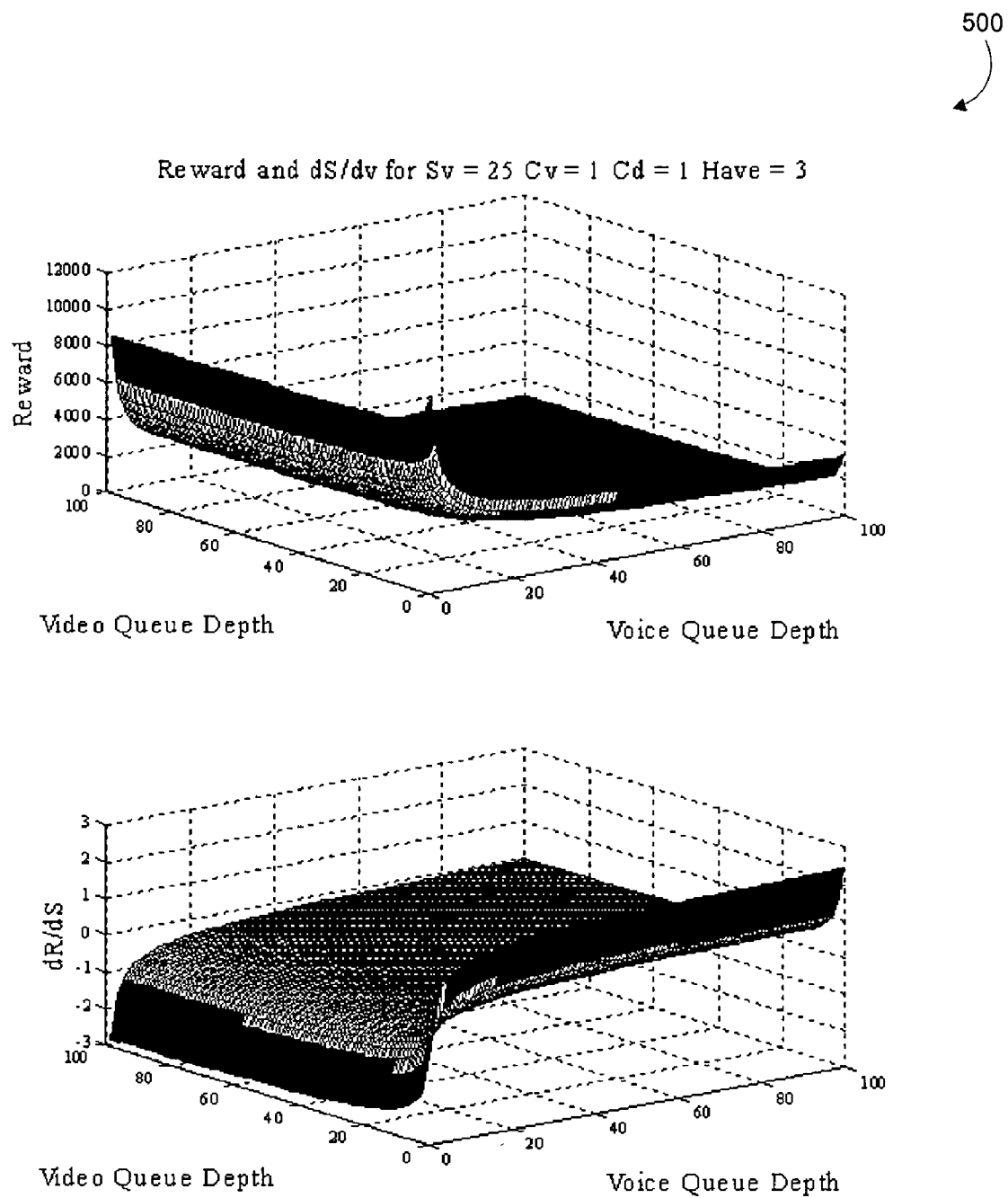
FIG. 5 is an exemplary graphical illustration of an output of a reward function and a derivative function according to a possible embodiment.

FIG. 5 is an exemplary graphical illustration 500 of the output of the reward function and derivative function over the range of queue depths between 1 and 100 for $s_v$=25 and $s_v$=75 with equal scaling factors for voice and video with a voice coefficient ($C_v$) and a video coefficient ($C_d$) of 1, assuming average hops per flow ($H_{ave}$) of 3 hops. It can be seen that for low voice queue depth and high video queue depths, the derivative term is negative, indicating that an increase in source provision for voice will decrease reward. This can indicate an adjustment to reduce voice provision and increase video provision. In contrast, for high voice queue depth and low video queue depth the reverse can be true, which can indicate an increase in voice provision. This derivative function can be utilized to perform periodic updates to the WFQ provisions of the form:

$$\Delta s_v = \alpha \frac{dR_{total}}{ds_v}$$

$$\Delta s_d = -\Delta s_v$$

where α can be a tunable, positive, scaling factor that could be set, could be determined empirically, and may or may not be used. Since this periodic update can be based solely on local data, the algorithm can be called Local Adaptive Provisioning (LAP).

Figure 6:
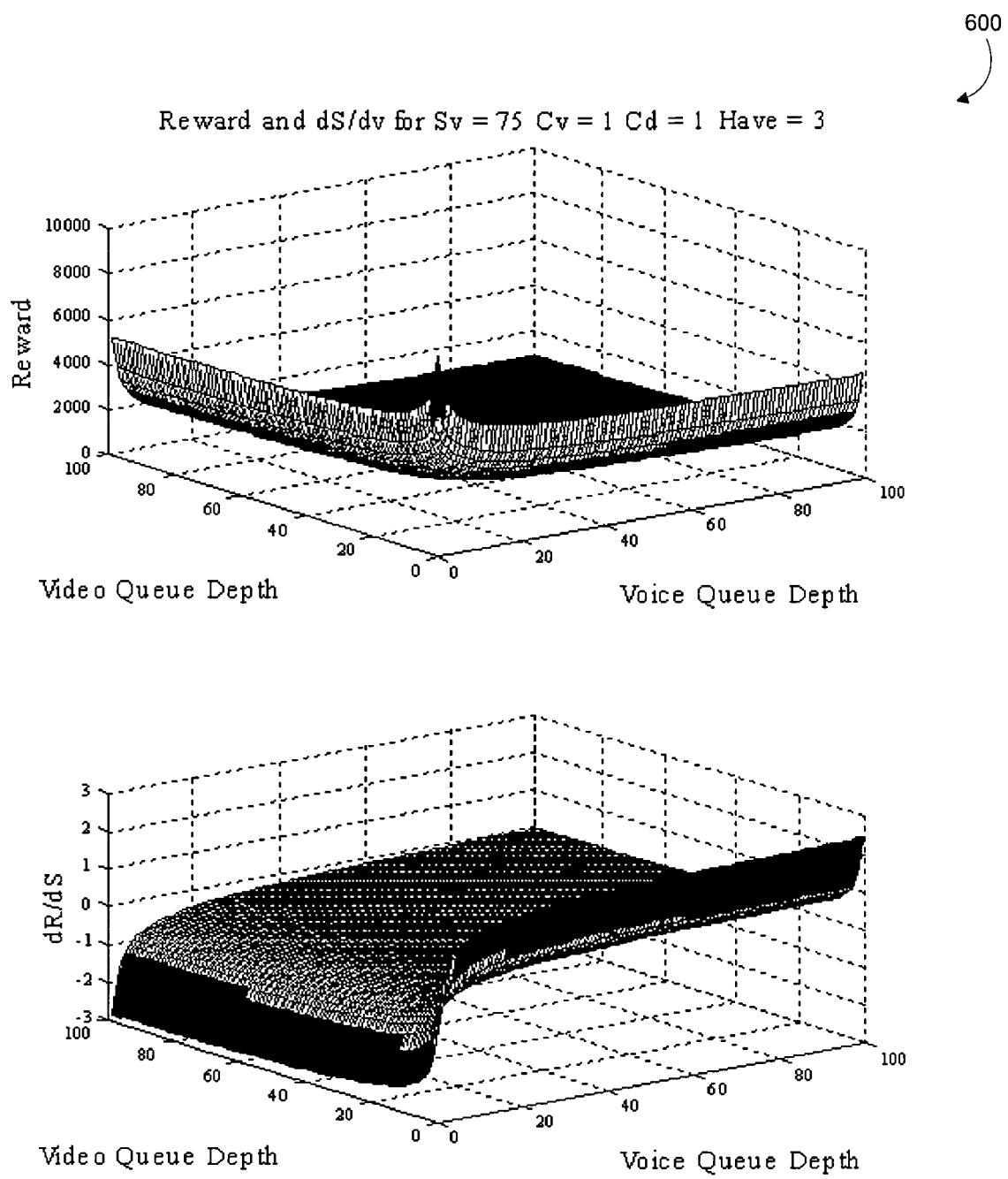
FIG. 6 is an exemplary graphical illustration of an output of a reward function and a derivative function according to another possible embodiment.

FIG. 6 is an exemplary graphical illustration 600 of the output of the reward function and derivative function (dR/$dS_d$) for a provision of $S_v$=75%. At this provisioning moderately high reward conditions can exist for both low video and low voice queue depths.

Figure 7:
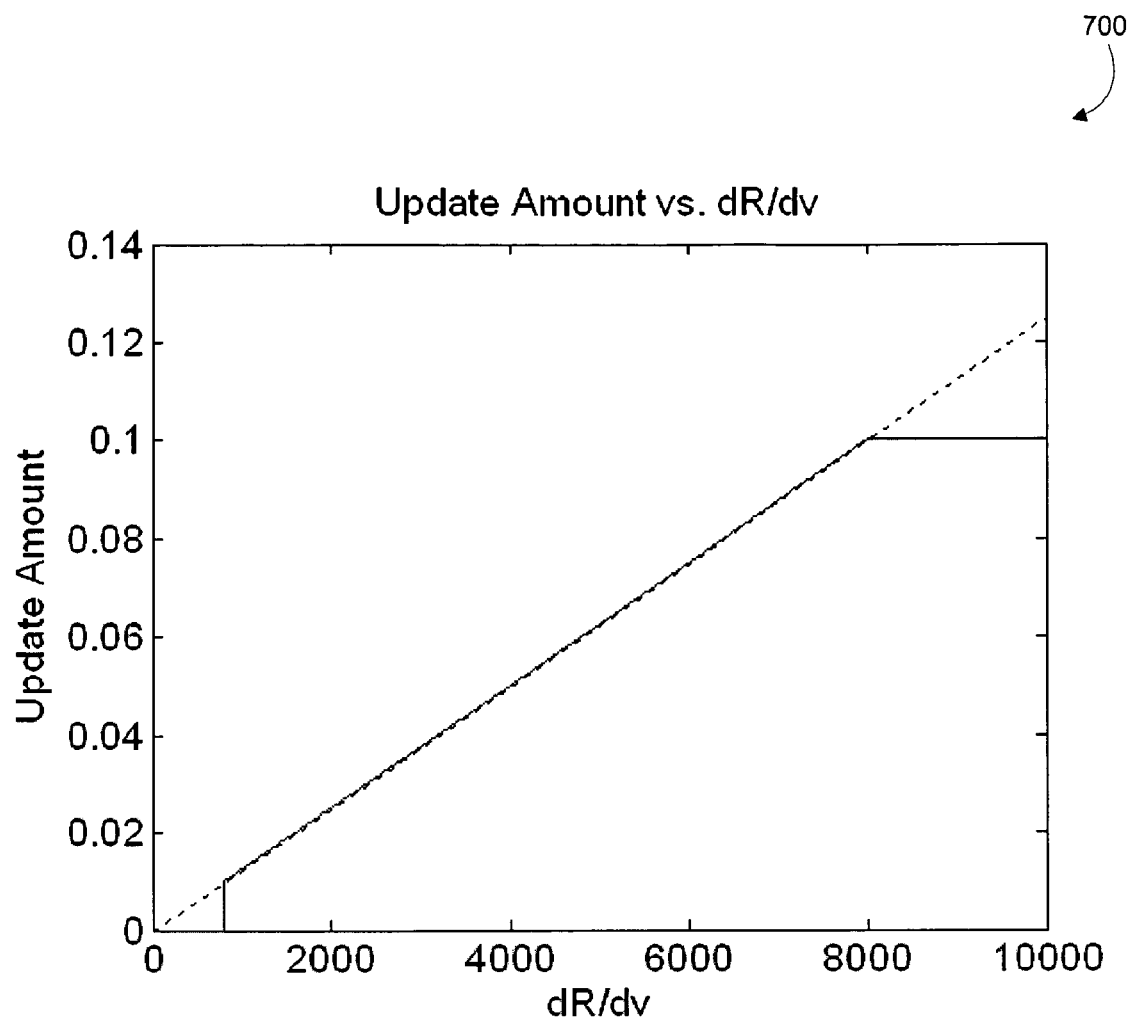
FIG. 7 is an exemplary graph illustrating an example of an amount of weighted fair queue change according to one possible embodiment.

FIG. 7 is an exemplary graph illustrating an example of how the amount of WFQ change can be proportional to dR/dv, with a maximum change of 10% at each interval, and a minimum of no change if dR/dv did not exceed a tunable threshold. The amount the WFQ provision can be changed for a given dR/dv calculation, where v represents voice provision. The minimum threshold of 800 can correspond to a change of 1%, and the maximum threshold at 8000 can corresponds to a change of 10%. All thresholds can be tunable for a given scenario.

Simulations were done to test the performance of a network with and without individual node adaptation. The scenario consisted of 15 nodes using transmitting mixed traffic, or two classes of "voice" and "video." The LAP algorithm was invoked after queues stabilized for 300 seconds and it considered dR/dv values for the next 300-second window.

Figure 8:
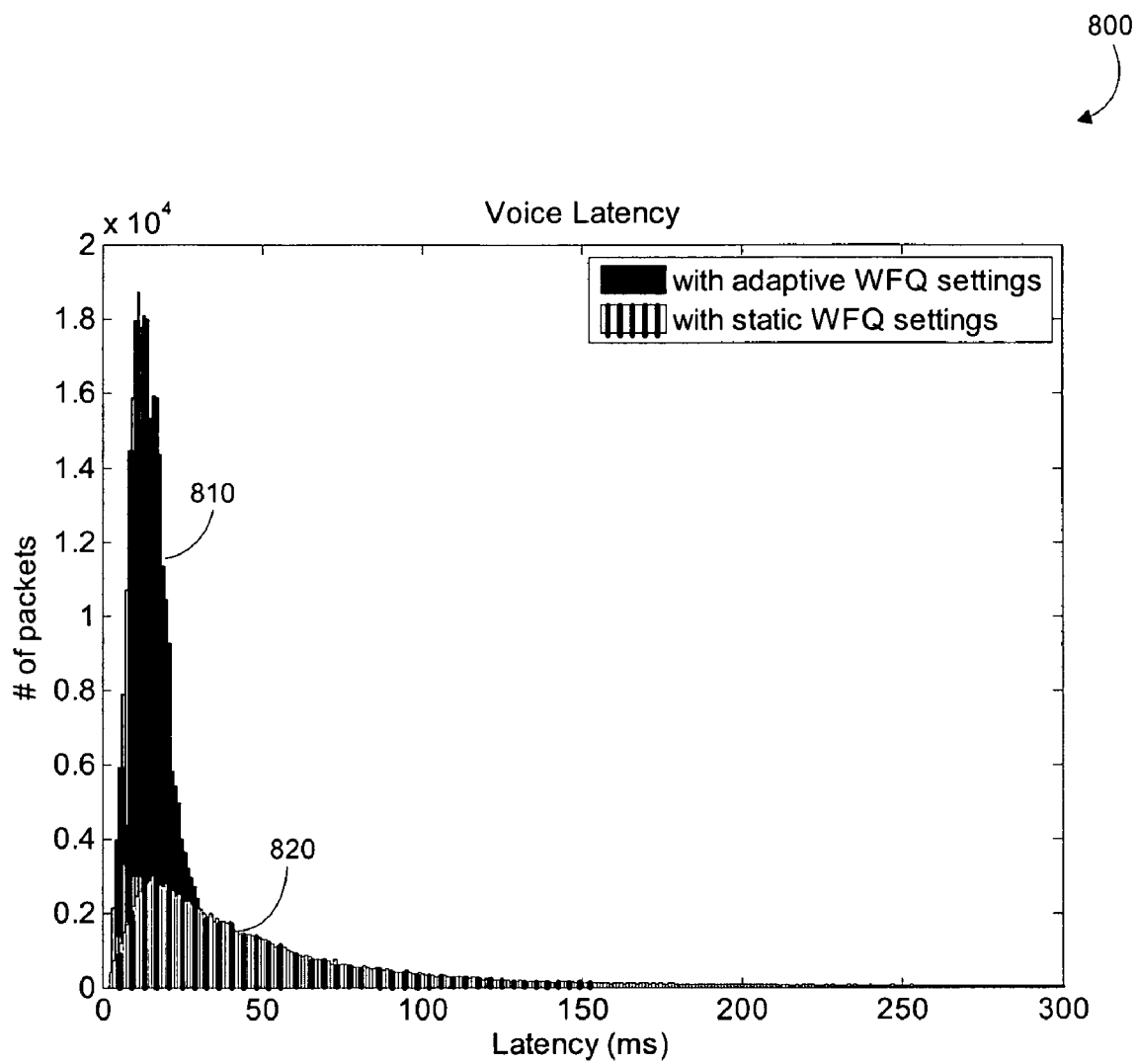
FIG. 8 is an exemplary graph illustrating simulation results of End-to-End Voice Latency according to one possible embodiment.

FIG. 8 is an exemplary graph 800 illustrating simulation results of End-to-End Voice Latency according to one possible embodiment. The graph 800 shows the number of packets served with respect to latency when adaptive WFQ settings were used 810 and when static WFQ settings were used 820.

Figure 9:
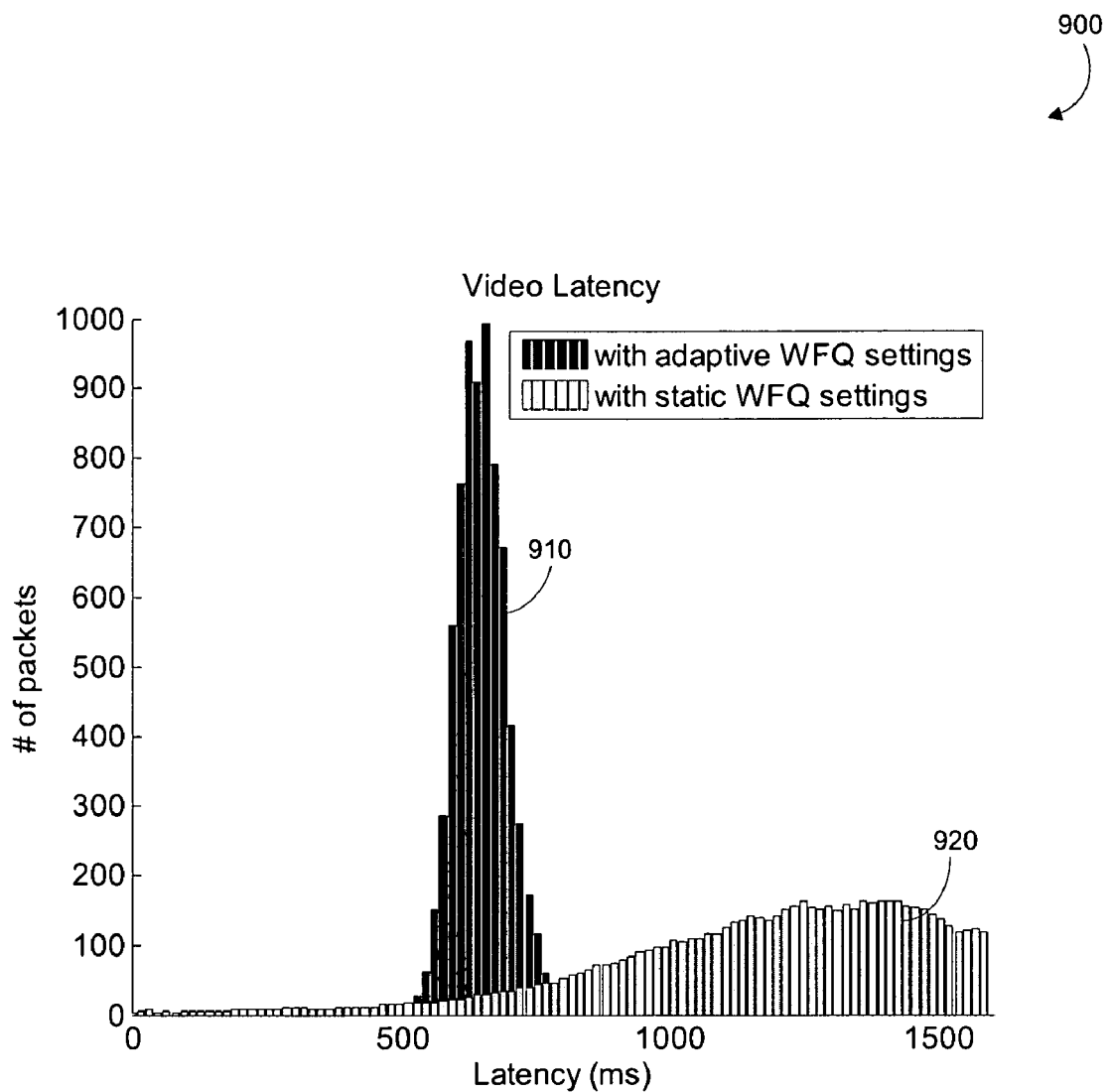
FIG. 9 is an exemplary graph illustrating simulation results of End-to-End Video latency according to another possible embodiment.

FIG. 9 is an exemplary graph 900 illustrating simulation results of End-to-End Video latency according to another possible embodiment. The graph 900 shows the number of packets served with respect to latency when adaptive WFQ settings were used 910 and when static WFQ settings were used 920. As shown in graph 800 and graph 900, the affect of LAP can be significant, with approximately 33% increase in successful packets for both voice and video traffic.

Figure 10:
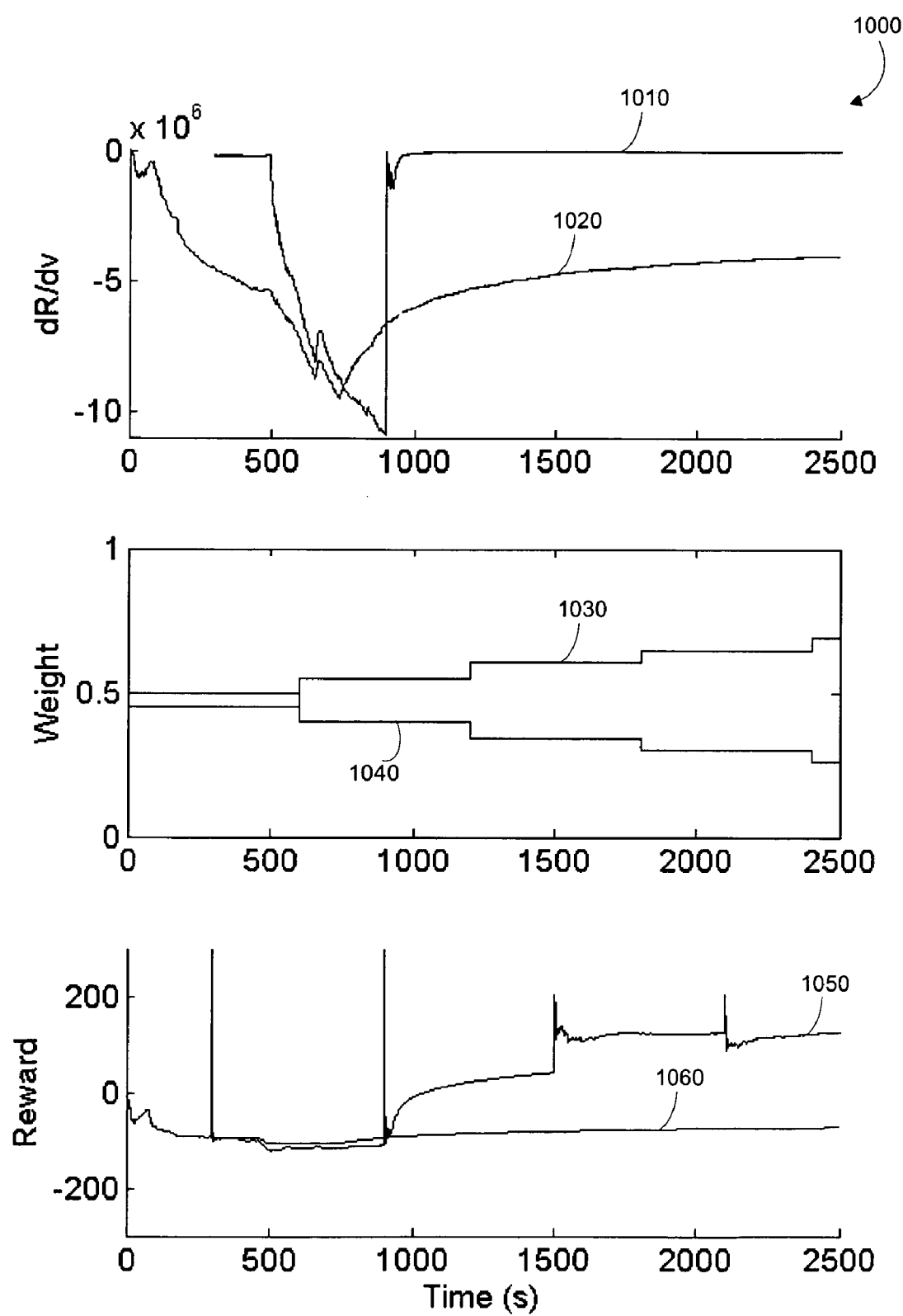
FIG. 10 is an exemplary illustration of examples of how Local Adaptive Provisioning algorithm functions at a node according to one possible embodiment.

FIG. 10 is an exemplary illustration 1000 of examples of how the Local Adaptive Provisioning algorithm functioned at a node in the scenario above. The illustration 1000 includes results for dR/dv with adaptive WFQ settings 1010, dR/dv with static WFQ settings 1020, video weight 1030, voice weight 1040, Reward with adaptive WFQ settings 1050, and Reward with static WFQ settings 1060.

As shown, a node after 600 seconds has calculated a negative dR/dv value that drives reduction in voice provision by the maximum value possible, −10%. The dR/dv curve progressed from strongly negative values to near zero. After 600 seconds the dR/dv is still negative, although to a smaller degree, resulting in further, yet smaller changes is voice and video provision. The weight, or voice provision, decreased and video provision increased, driven by dR/dv, at first changing in larger increments. The Reward value for the adaptive case increased as a result of LAP, while in the static case reward remains below zero, indicating that the node has an accurate view of better global success in the adaptive case than in the non-adaptive case. The spikes in the bottom graph show a resetting of the averaging window 300 seconds after each change.

The effect of these changes to the WFQ provisions on node were seen in the traffic streams flowing through the node. The benefits to mean latency and jitter were demonstrated where latency under LAP improved over the static case as the simulation progressed. While the LAP algorithm caused video provision to increase on one node, the opposite effect occurred on another node where the dR/dv curve progresses from strongly positive values to near zero. Voice provision increased and video provision decreased as driven by dR/dv.

This resulted in a higher reward value for when LAP is used and lower latency for the voice stream traversing the other node.

For more than two classes of traffic, instead of creating a function of one variable, $s_v$, the provision of each class of traffic can be left as an independent variable and the partial derivative of R can be taken with respect to n classes:

$$R = \sum_{i=1}^{n} c_i Z_i = \sum_{i=1}^{n} \frac{C_i\left(l_i - \overline{h}_i \frac{\overline{q}_i}{s_i}\right)}{\sqrt{\overline{h}_i \frac{\overline{q}_i}{s_i}}}$$

and:

$$\frac{dR}{ds_i} = \frac{C_i(l_i s_i + \overline{h}_i \overline{q}_i)}{2 s_i^{3/2} \sqrt{\overline{h}_i \overline{q}_i}}$$

As above, the solution can be constrained such that the sum of all WFQ provisions remains 1, or in other words, that the sum of WFQ provision changes is 0. Thus the periodic updates can be of the form:

$$\Delta s_i = \alpha \cdot n \left(\frac{dR}{ds_i} + c\right)$$

$$\sum \Delta s_i = 0$$

where α can be a scaling factor and c can be a normalizing constant. For the case of two classes of traffic, v and d, this can become:

$$\Delta s_v = \alpha \cdot 2 \left(\frac{dR}{ds_v} + c\right)$$

$$\Delta s_d = \alpha \cdot 2 \left(\frac{dR}{ds_d} + c\right)$$

$$\Delta s_v + \Delta s_d = 0$$

solving for c can give:

$$c = -\frac{\frac{dR}{ds_v} + \frac{dR}{ds_d}}{2}$$

and finally solving for $\Delta s_v$ and $\Delta s_d$ can give:

$$\Delta s_v = \alpha \left(\frac{dR}{ds_v} - \frac{dR}{ds_d}\right)$$

$$\Delta s_d = -\Delta s_v$$

Thus, this multi-class solution can reduce to the previous result for the case of two classes. In the general case of n classes, c can be the opposite of the mean of all $$\frac{dR}{ds_i}$$

terms, and $$\Delta s_i = \alpha \left((n-1)\frac{dR}{ds_i} - \sum_{j \neq i} \frac{dR}{ds_j}\right)$$

Thus, the present disclosure can provide for a Local Adaptive Provisioning (LAP) algorithm to address the problem of adaptive Quality of Service (QoS) configuration of weighted fair queuing (WFQ) parameters. A reward function based on local estimation of global end-to-end success can be constructed and its derivative can be calculated to produce an algorithm capable of adapting voice and video and other real time traffic WFQ settings that can be based solely on local information to improve E2E success. Among other benefits, results of simulations show this algorithm can be effective in optimizing E2E QoS for mixed voice and video traffic. The algorithm can handle more than two classes of traffic.

For example, an adaptive quality of service architecture can learn local WFQ configuration settings based on queue depth and projected E2E success. The adaptive strategy can provide for local node optimization based on local node parameters and can allow the network to flex to different settings as needed accommodating hot spots and traffic bottlenecks. Local information can be used to project of E2E success. Also, excessive and unnecessary signaling can be avoided using WFQ bandwidth allocation based on an equation using local queue depths as input. More successful traffic can be serviced by a network, which can provide advantages for wireless and other networks.

The method of this disclosure is preferably implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The terms "comprises,"

"comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A method comprising:
   determining a per packet latency for a class of packet network traffic in a queue of a plurality of queues for a plurality of classes of packet network traffic at a node;
   establishing, using a local adaptive provisioning module at the node, a reward function for the class of packet network traffic based on a packet latency limit, based on the per packet latency, and based on a source rate for the class of packet network traffic; and
   adjusting provisioning of a queue servicing module for the queue at the node based on the reward function, where the provisioning comprises the priority of accessing each of the plurality of queues by the queue servicing module,
   wherein the reward function penalizes end to end packet failures as measured by end to end latency exceeding a threshold based on relative weighting assigned to failures of each class, and
   wherein the reward function is further based on an average hop count and based on at least one other class of packet network traffic.

2. The method according to claim 1, wherein determining a per packet latency includes determining a number of packets for a class of packet network traffic in a queue of a plurality of queues for a plurality of classes of packet network traffic at the node.

3. The method according to claim 1, wherein the reward function reflects an anticipated end-to-end success of the class of packet network traffic.

4. The method according to claim 1, further comprising determining changes in the reward function with respect to changes in the source rate for the class of packet network traffic with respect to at least one other class of packet network traffic,
   wherein adjusting comprises increasing provisioning for the class of packet network traffic to maximize the change in the reward function.

5. The method according to claim 4, wherein adjusting comprises increasing provisioning for the class of packet network traffic if the change in the reward function is maximized and above a threshold.

6. The method according to claim 1, wherein the per packet latency comprises a mean per packet latency.

7. The method according to claim 1, wherein the reward function is further based on additional measured information from a network management system.

8. The method according to claim 1, wherein adjusting the provisioning of a queue at the node is based on a change in provision $\Delta s$ for a class i according to:

$$\Delta s_i = \alpha \left( \frac{dR}{ds_i} + c \right),$$

where $\alpha$ represents a scaling factor, R represents the reward function, $dR/ds_i$ represents a rate of change in the reward function, R, with respect to a throughput, s, for a given class, i, and c represents a normalizing constant.

9. An apparatus comprising:
   an input configured to receive a packet;
   a plurality of queues coupled to the input, the plurality of queues configured to queue a plurality of classes of packet network traffic at a node, where the plurality of queues comprise a plurality of hardware queues;
   a queue servicing module coupled to the plurality of queues, the queue servicing module configured to access the plurality of queues to give priority to higher packet priority level queues; and
   a local adaptive provisioning module coupled to the plurality of queues and coupled to the queue servicing module, the local adaptive provisioning module configured to determine a per packet latency for a class of packet network traffic in a queue of the plurality of queues, establish a reward function for the class of packet network traffic based on a packet latency limit, based on the per packet latency, and based on a source rate for the class of packet network traffic, and adjust provisioning of the queue servicing module for the queue at the node based on the reward function
   wherein the reward function penalizes end to end packet failures as measured by end to end latency exceeding a threshold based on relative weighting assigned to failures of each class, and
   wherein the reward function is further based on an average hop count and based on at least one other class of packet network traffic.

10. The apparatus according to claim 9, wherein the local adaptive provisioning module determines a per packet latency by determining a number of packets for a class of packet network traffic in the queue of the plurality of queues for a plurality of classes of packet network traffic at the node.

11. The apparatus according to claim 9, wherein the reward function reflects an anticipated end-to-end success of the class of packet network traffic.

12. The apparatus according to claim 9, wherein the local adaptive provisioning module is configured to determine changes in the reward function with respect to changes in the source rate for the class of packet network traffic with respect to at least one other class of packet network traffic and adjust the provisioning by increasing provisioning for the class of packet network traffic to maximize the change in the reward function.

13. The apparatus according to claim 12, wherein the local adaptive provisioning module increases provisioning for the class of packet network traffic if the change in the reward function is maximized and above a threshold.

14. The apparatus according to claim 9, wherein the per packet latency comprises a mean per packet latency.

15. The apparatus according to claim 9, wherein the local adaptive provisioning module adjusts the provisioning of a queue at the node based on a change in provision $\Delta s$ for a class i according to:

$$\Delta s_i = \alpha\left(\frac{dR}{ds_i} + c\right),$$

where α represents a scaling factor, R represents the reward function, $dR/ds_i$ represents a rate of change in the reward function R with respect to a throughput s for a given class i, and c represents a normalizing constant.

16. A method comprising:

determining an average per packet latency for a class of packet network traffic based on a number of packets for the class of packet network traffic in a queue of a plurality of queues for a plurality of classes of packet network traffic at a node;

establishing, using a local adaptive provisioning module at the node, a reward function for the class of packet network traffic based on a packet latency limit, based on the per packet latency, and based on a source rate for the class of packet network traffic; and adjusting provisioning of the queue at the node based on the reward function based on a change in provision Δs for a class i according to:

$$\Delta s_i = \alpha\left(\frac{dR}{ds_i} + c\right),$$

where α represents a scaling factor, R represents the reward function, $dR/ds_i$ represents a rate of change in the reward function R with respect to a throughput s for a given class i, and c represents a normalizing constant.

* * * * *